(No Model.)

J. M. TEASDALE.
FRUIT EVAPORATOR.

No. 260,910. Patented July 11, 1882.

Attest:
H. S. Sprague
E. Scully

Inventor:
James M. Teasdale
By Thos. S. Sprague
Atty.

UNITED STATES PATENT OFFICE.

JAMES M. TEASDALE, OF HOWELL, MICHIGAN.

FRUIT-EVAPORATOR.

SPECIFICATION forming part of Letters Patent No. 260,910, dated July 11, 1882.

Application filed April 13, 1882. (No model.)

*To all whom it may concern:*

Be it known that I, JAMES M. TEASDALE, of Howell, in the county of Livingston and State of Michigan, have invented new and useful Improvements in Fruit-Evaporators; and I do hereby declare that the following is a full, clear, and exact description thereof, reference being had to the accompanying drawings, which form a part of this specification.

The nature of this invention relates to certain new and useful improvements in the construction of devices ordinarily denominated "fruit-evaporators," the object of the invention being to provide means for the utilization of heat radiated from a nest of steam-heaters at the bottom of a shaft or chamber, within which the fruit to be operated upon is conveyed from top to bottom upon trays supported and carried by endless belts; and the invention consists in the peculiar construction, arrangement, and various combinations of the parts, all as more fully hereinafter set forth.

Figure 1:
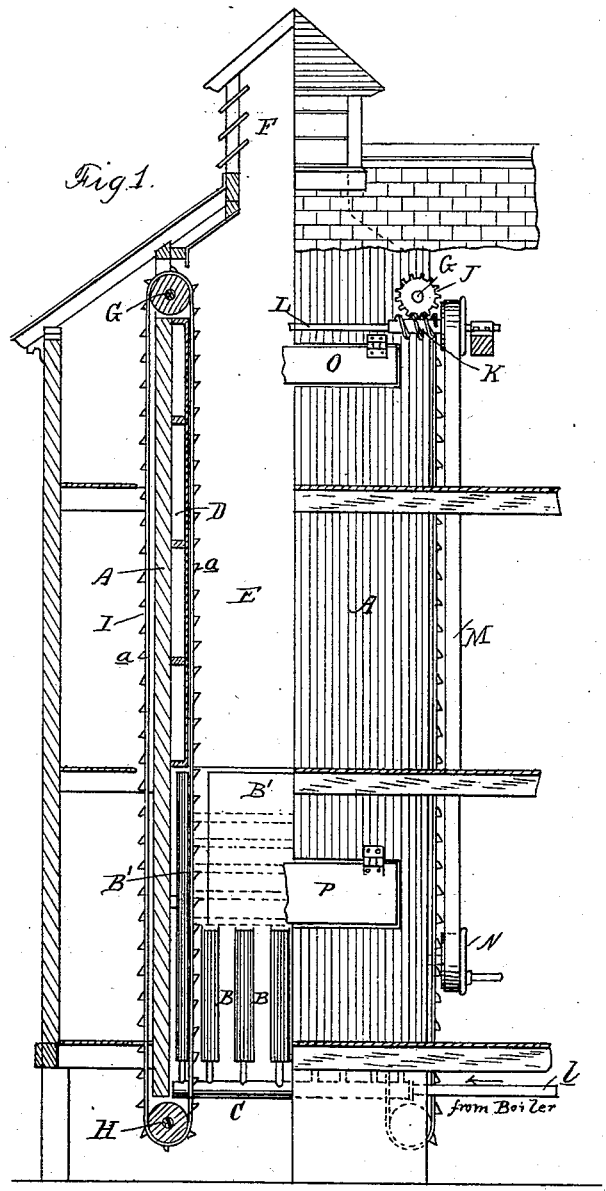
Figure 2:
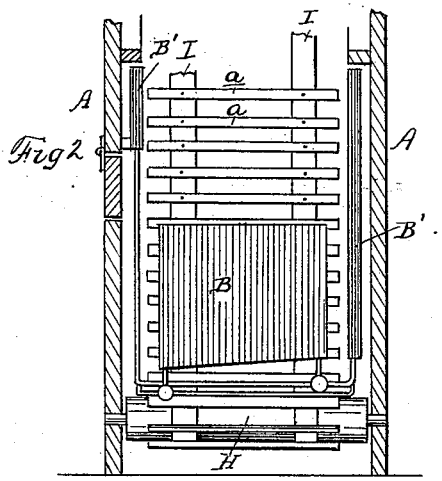

Figure 1 is a front elevation, one-half in vertical section, of my improved evaporator. Fig. 2 is a vertical section at right angles to Fig. 1 of the lower portion of the device.

In the accompanying drawings, A represents the outer walls of my device, which is designed to be erected within a suitable building or inclosure, and to extend, as shown in the drawings, above the third floor, although the length or height of the device will be determined more particularly by the capacity for evaporation. In the bottom of the chamber or shaft formed by these walls I secure a series of steam-heaters, B B', consisting of rectangular steam-flues or coils of pipe so arranged as to take steam from any convenient source of supply through the pipes $c$ and $l$.

A portion of the heaters, B, extend only to the base of the door $p$, while other heaters, B', extend above the door-opening, so as to surround several of the lower trays in the heater. The inner faces of the walls A above these heaters are furred out by any suitable furring, D, so as to form the shaft or chamber E of a uniform size from top to bottom with the outer heaters, B'; and above this shaft or chamber E is formed a ventilator, F, of any desired construction.

At the upper end of the chamber, and in the opposite walls thereof, I properly journal shafts or rollers G.

At the bottom of the device, below the heaters, are secured similar shafts or rollers, H, and around each pair of rollers G H, I place an endless belt or belts, I, upon which are secured the slats $a$ at equal distances apart.

One end of each of the shafts G carries a pinion, J, which meshes with a worm, K, upon each end of the transverse shaft L, journaled across and near the top of the device, as shown in Fig. 1, and this shaft L, I represent as adapted to be rotated by means of a belt, M, and a pulley, N, near the lower end of the chamber; but I do not desire to confine myself to this means of rotating such shaft, as there are various ways in which it can be accomplished.

In the front wall of the chamber I arrange the doors O and P.

In practice the fruit to be operated upon is placed upon proper trays, (not shown,) and these trays are inserted through the door-opening O, resting upon the slats $a$ of the belts I, the said belts being intermittently rotated until the chamber is full of fruit-bearing trays from top to bottom. The action of the heat radiated from the nest of heaters described evaporates the moisture from the fruit very rapidly, and when it is desired to remove the fruit the trays are taken out through the lower door, P, and the belts being thus intermittently rotated, fresh and green fruit is placed in at the top as dried fruit is taken out at the bottom, and introducing the green fruit at a point above the fruit which has been operated upon, the moisture thrown-off by such green fruit does not in any way affect that which has been previously placed in the device, while it is also presented to the action of heat at a point farthest away from the heaters, which it gradually approaches in the operation of the device, and will generally be found sufficiently dried by the time its respective tray has reached the bottom of the device.

I am aware that fruit-driers have been heretofore provided with steam-heaters and with endless carriers for raising trays in a vertical shaft, and I do not broadly claim such devices.

What I claim is—

1. The combination, with the shaft A, of the endless slatted belts I and a series of steam-heaters, B B', the heaters B' at the sides of the shaft extending above the center heaters, B, substantially as described.

2. The combination, with the shaft A, of the endless slatted belts I and a series of steam-heaters, B B', the outer heaters, B', extending around the interior of the shaft and above the central heaters, B, and the furring D for making the shaft of equal inner diameter with the heaters B', substantially as described.

3. The combination, with the shaft A, of the endless slatted belts I, the steam-heaters B B', the shafts G, H, and L, gears on the ends of the shafts G, and worms K on the shaft L, substantially as described, and for the purpose specified.

JAMES M. TEASDALE.

Witnesses:
H. S. SPRAGUE,
J. Q. ADAMS.